United States Patent
Myers et al.

(10) Patent No.: US 8,830,657 B2
(45) Date of Patent: Sep. 9, 2014

(54) SWITCHBOARD AND METHOD OF MANUFACTURING SAME

(75) Inventors: Scott Charles Myers, Shepherdsville, KY (US); Yogesh Krishnarao Ingole, Andhra Pradesh (IN); Gary Paul Michaelis, Oakville, CT (US); Justin Michael Meehan, Mebane, NC (US); Debra Lynn Giannelli, Thomaston, CT (US); Charles Allen Roth, New Market, TN (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 13/364,051

(22) Filed: Feb. 1, 2012

(65) Prior Publication Data

US 2013/0194727 A1    Aug. 1, 2013

(51) Int. Cl.
    *H02B 1/40*    (2006.01)

(52) U.S. Cl.
    USPC ............ 361/641; 361/633; 361/634; 361/644

(58) Field of Classification Search
    USPC .................................. 361/641, 633–634, 644
    See application file for complete search history.

(56) References Cited

U.S. PATENT DOCUMENTS

| | | | | |
|---|---|---|---|---|
| 2,730,261 | A * | 1/1956 | Tutt ................................ | 220/3.7 |
| 3,566,194 | A * | 2/1971 | Gryctko ........................ | 361/652 |
| 4,021,632 | A | 5/1977 | Myers et al. | |
| 4,606,156 | A | 8/1986 | Sweers et al. | |
| 4,650,272 | A | 3/1987 | Doughty | |
| 4,842,156 | A * | 6/1989 | Nattel ............................. | 220/3.9 |
| 4,945,450 | A | 7/1990 | Sabatella et al. | |
| 5,072,071 | A * | 12/1991 | Cassity et al. ................ | 174/660 |
| 5,134,543 | A * | 7/1992 | Sharp et al. .................... | 361/644 |
| 5,341,273 | A * | 8/1994 | Sharp et al. .................... | 361/641 |
| 5,463,533 | A * | 10/1995 | Donnerstag et al. .......... | 361/825 |
| 5,491,901 | A * | 2/1996 | Parrino ........................... | 33/528 |
| 5,579,939 | A * | 12/1996 | Bourassa ........................ | 220/3.3 |
| 5,744,753 | A * | 4/1998 | Nattel ............................. | 174/58 |
| 5,861,794 | A | 1/1999 | Pellon | |
| 5,934,115 | A | 8/1999 | Bernier et al. | |
| 6,274,833 | B1 | 8/2001 | Moody | |
| 6,715,625 | B2 * | 4/2004 | MacDonald ................... | 220/3.5 |
| 6,756,541 | B1 * | 6/2004 | Mollick et al. ................ | 174/58 |
| 6,808,079 | B2 * | 10/2004 | Lalancette et al. ............ | 220/3.3 |
| 6,979,780 | B1 * | 12/2005 | Lalancette ...................... | 174/50 |
| 7,423,215 | B2 * | 9/2008 | Cardenas et al. .............. | 174/50 |
| 7,554,032 | B2 * | 6/2009 | Herth ............................. | 174/50 |
| 7,589,277 | B2 * | 9/2009 | Kessler et al. ................. | 174/50 |
| 7,935,886 | B2 * | 5/2011 | Jafari ............................. | 174/58 |
| 8,536,452 | B2 * | 9/2013 | Jafari ............................. | 174/50 |
| 8,710,368 | B2 * | 4/2014 | Phillips et al. ................. | 174/57 |
| 2006/0157264 | A1* | 7/2006 | Cardenas et al. .............. | 174/50 |
| 2014/0008095 | A1* | 1/2014 | Lalancette et al. ............. | 174/50 |

FOREIGN PATENT DOCUMENTS

CA      2307540 A1 * 11/2000      ............. H02G 3/10

* cited by examiner

*Primary Examiner* — Robert J Hoffberg
(74) *Attorney, Agent, or Firm* — General Electric Company

(57) ABSTRACT

A switchboard for coupling with a structure surface includes a panel box comprising a back wall and at least one sidewall extending from the back wall. The sidewall comprising a front. The switchboard further includes a door panel coupled to the front of the side and a positioning member located in the sidewall. The positioning member comprising a fixed end coupled to the sidewall and a moveable end configured to be positioned to contact the structure surface when the front of the panel box is at a pre-determined distance from the structure surface.

13 Claims, 7 Drawing Sheets

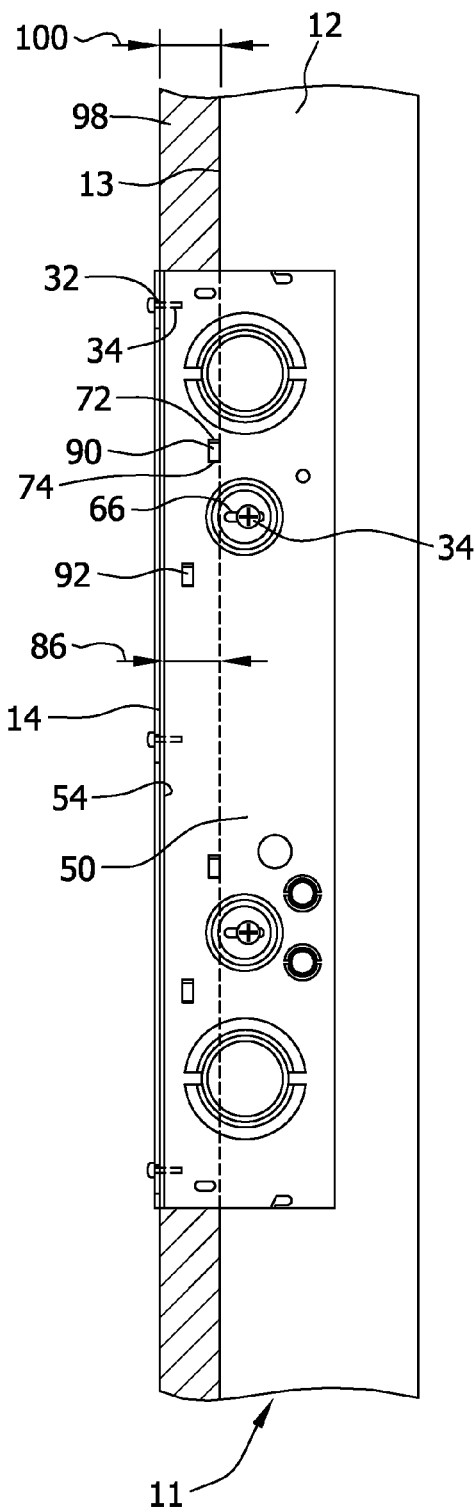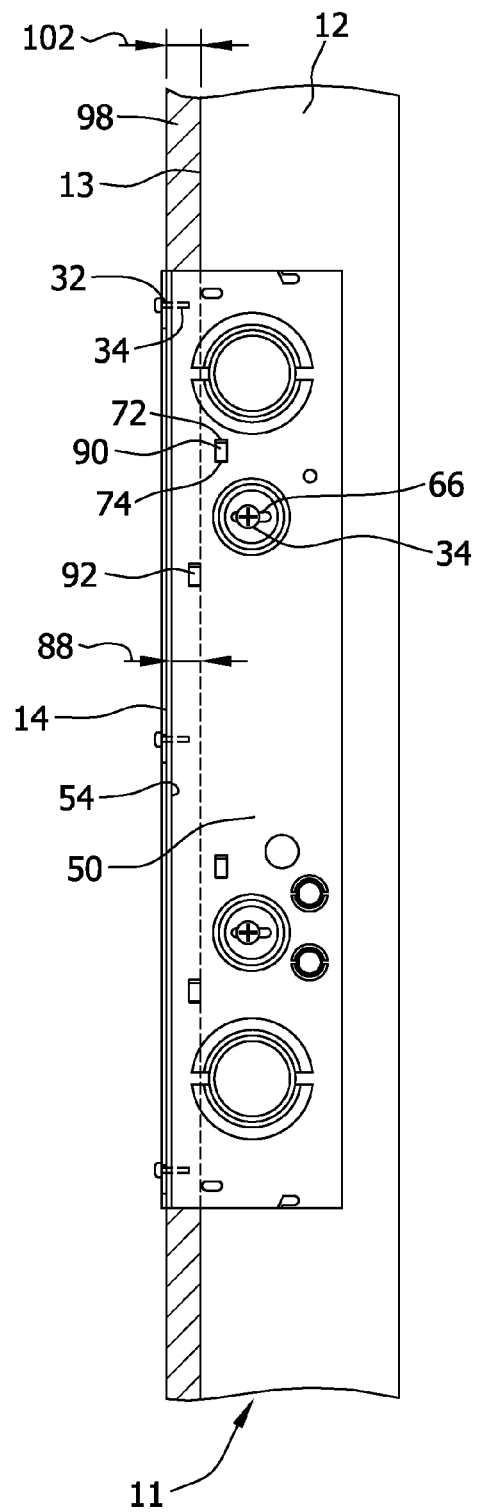

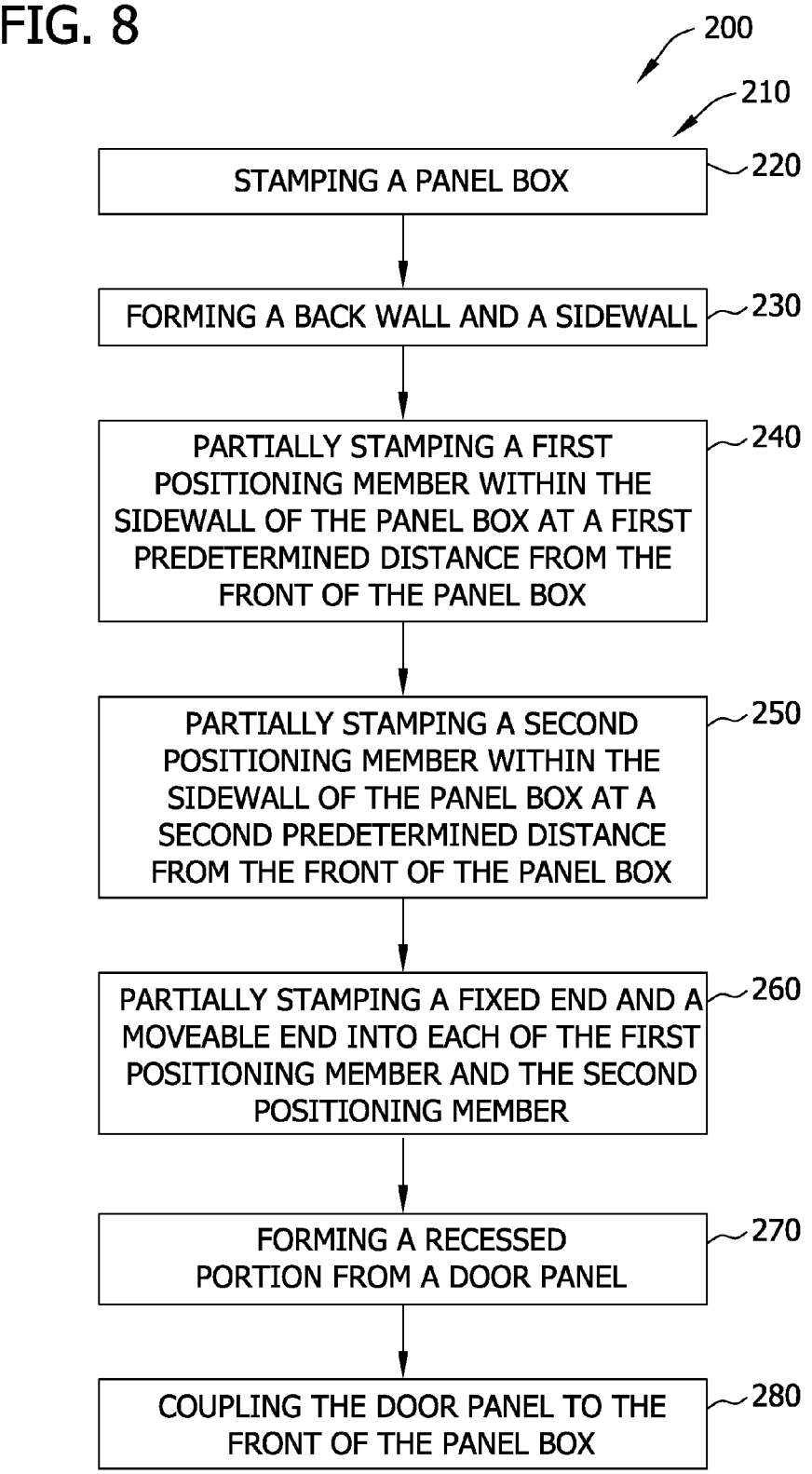

SWITCHBOARD AND METHOD OF MANUFACTURING SAME

BACKGROUND OF THE INVENTION

The embodiments described herein relate generally to a switchboard, and more particularly, to methods and systems used to mount the switchboard to a surface.

A switchboard is a device that directs electricity from one source to another. The switchboard includes an assembly of panels, each of which contains switches that allow electricity to be redirected. The switchboard also includes protective devices such as circuit breakers. The switchboard is used to divide the main current provided to the switchboard into smaller currents for further distribution and to provide switching, current protection and metering for the various currents. In general, switchboards distribute power to electrical devices such as transformers, control equipment, and ultimately to system loads. Known switchboards use a door panel. Typically, most of the surface area of the door panel has been removed to provide access to the switches and protective devices. Removing most of the surface area from the door panel leads to a weakened door panel and material waste in forming the door panel.

Electrical codes and building codes define installation requirements for the switchboard. Conventional switchboards are mounted to building frames such as wood studs for proper load centering of the switchboard. After installation, installers mount drywall to the studs and around the switchboard to finish the room. Properly installing switchboards, however, is a labor intensive process. During known installation processes, the installer places the switchboard against the stud with one hand and attempts to fasten the switchboard to the stud with the other hand. This installation may lead to improper installation with respect to the stud. Further, the installer sometimes guesses the position on the stud to compensate for the subsequent drywall thickness leading to time consuming and costly trial and error installation of the switchboard.

BRIEF DESCRIPTION OF THE INVENTION

In one aspect, a switchboard for coupling with a structure surface is provided. The switchboard includes a panel box comprising a wall and at least one side extending from the wall. The side comprises a front, a rear and a positioning member thereon, said positioning member comprising a fixed end and a moveable end, said moveable end configured to contact the structure surface when said front of said panel box is at a pre-determined distance from the structure surface.

In another aspect, a switchboard is provided for coupling with a structure surface. The switchboard includes a panel box comprising a back wall and at least one sidewall extending from back wall and comprising a front. The switchboard further includes a door panel coupled to the front of the sidewall and a positioning member located on the side. The positioning member comprising a fixed end and a moveable end. The fixed end is coupled to the sidewall and the moveable end configured to be positioned to contact the structure surface when the front of the panel box is at a pre-determined distance from the structure surface.

In another aspect, a method of manufacturing a switchboard is provided that includes stamping a panel box to form a back wall and at least one sidewall extending from the back wall. The method also includes partially stamping a first positioning member within the sidewall of the panel box at a first predetermined distance from the back wall of the panel box such that the positioning member includes a fixed end and a moveable end and partially stamping a second positioning member within the sidewall of the panel box at a second predetermined distance from the back wall of the panel box such that the positioning member includes a fixed end and a moveable end. The method further includes forming a recessed portion in a door panel and coupling the door panel to the sidewall of the panel box.

BRIEF DESCRIPTION OF THE DRAWINGS

FIG. 5 illustrates a side view of the exemplary switchboard coupled to the structure shown in FIG. 4.

FIG. 6 illustrates another side of the exemplary switchboard coupled to the structure shown in FIG. 4.

FIG. 8 is an exemplary flowchart illustrating a method of manufacturing the exemplary switchboard shown in FIG. 1.

DETAILED DESCRIPTION OF THE INVENTION

Figure 1:
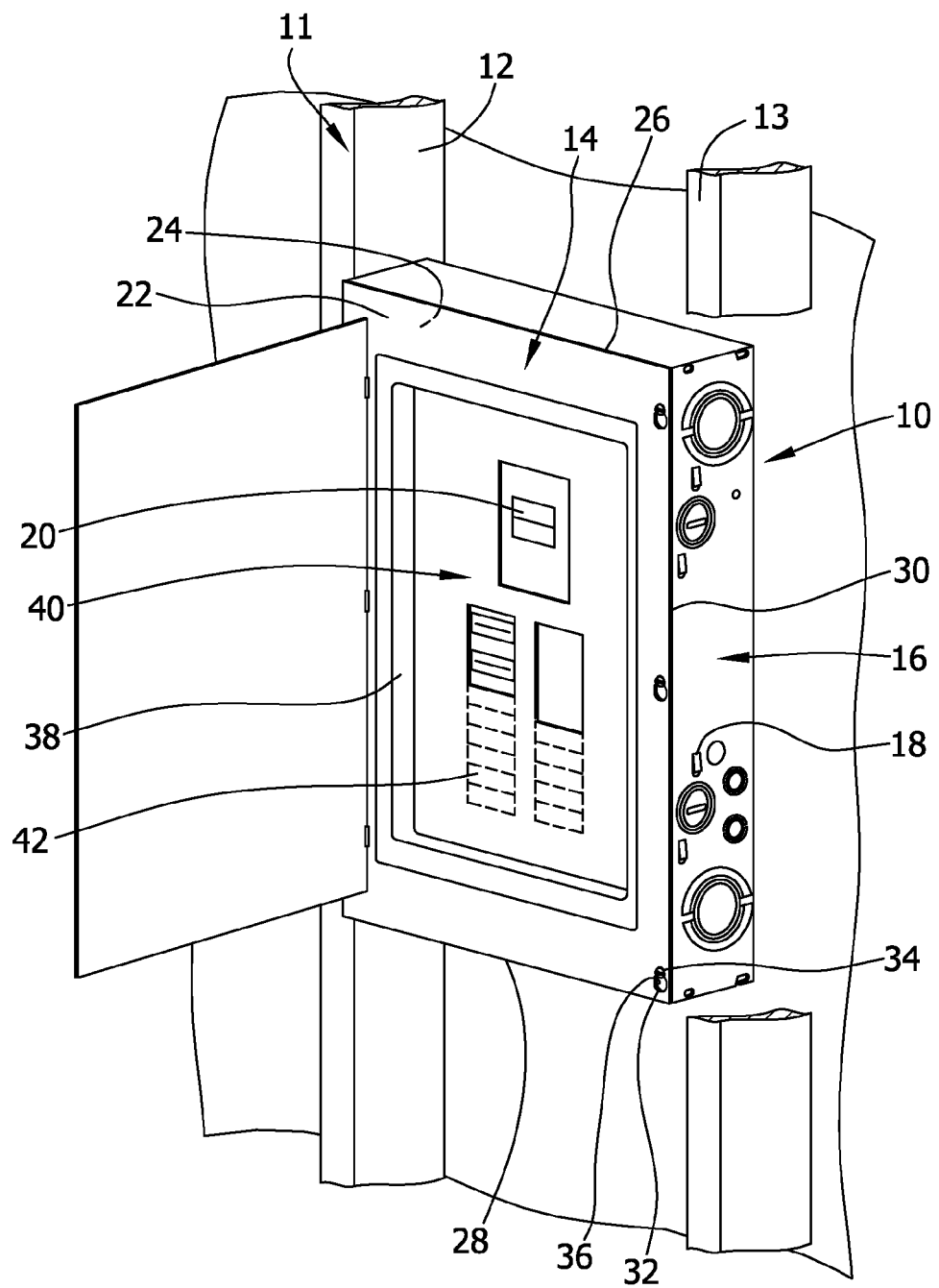
FIG. 1 illustrates a front perspective of an exemplary switchboard coupled to a structure.

FIG. 1 illustrates a front perspective view of an exemplary switchboard 10 coupled to a structure 11 which includes a first surface 12 and a second surface 13. Switchboard 10 includes a door panel 14, a panel box 16 and a positioning member 18. Door panel 14 is coupled to panel box 16 to facilitate access to electrical devices 20 such as, but not limited to, switches, circuit breakers and instruments.

Door panel 14 includes a front face 22, a rear face (not shown), a top 26, a bottom 28 and opposing sides 30. Door panel 14 further includes a plurality fastener apertures 32 that are defined through front face 22 and rear face 24, wherein each fastener aperture 32 is configured to accept a fastener 34 to couple door panel 14 to panel box 16. In one embodiment, each fastener aperture 32 includes a slotted opening 36 that includes a larger opening 36 and a smaller opening (not shown) extending from larger opening 36. In one embodiment, aperture 32 is configured such that a first portion of fastener 34 is extendable through larger opening 36 and then a second portion of fastener 34 slides into the smaller opening and maintains door panel 14 in a secure fit with front face 22.

Door panel 14 also includes a wall 38, a recessed portion 40 and a plurality of removable panels 42. Wall 38 extends between and couples front face 22 to recessed portion 40. Wall 38 is configured to offset recessed portion 40 from front face 22. In one embodiment, wall 38 and recessed portion 40 are pressurably formed from front face 22. Wall 38 and recessed portion 40 are configured to provide strength and rigidity to door panel 14. Removeable panels 42 are coupled to recessed portion 40 to provide access to electrical devices 20.

Figure 2:
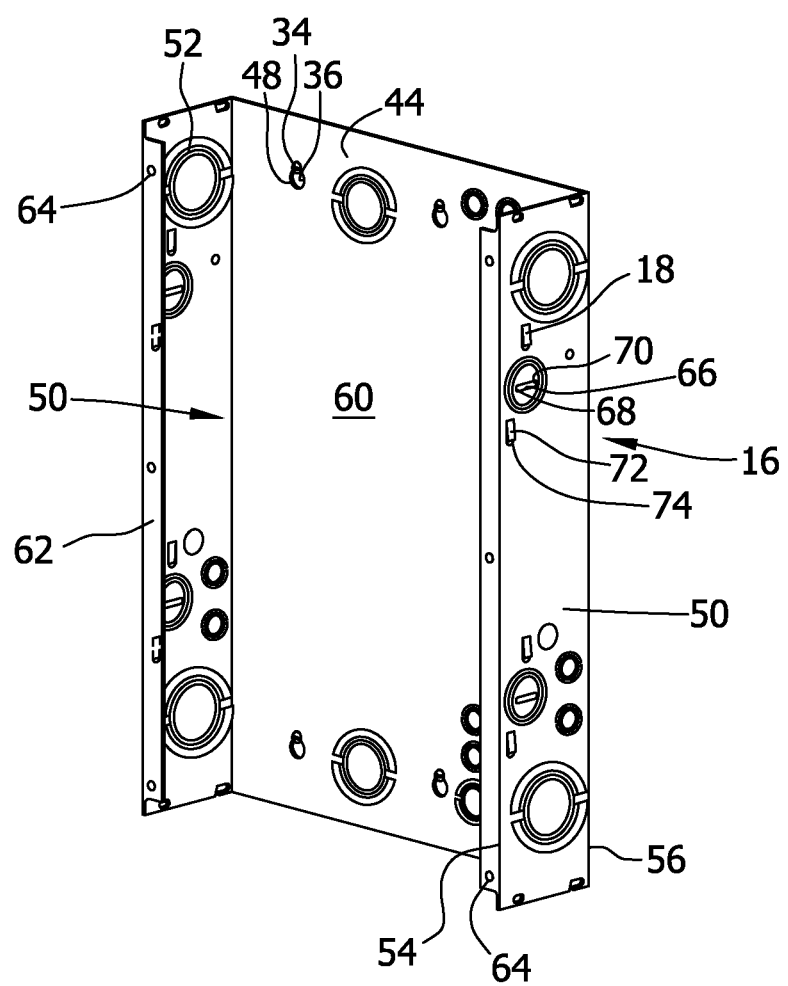
FIG. 2 illustrates a panel box of the exemplary switchboard shown in FIG. 1 and including a plurality of positioning members coupled thereto.

FIG. 2 illustrates panel box 16 of switchboard 10 (shown in FIG. 1) including a plurality of positioning members 18 coupled thereto. Panel box 16 includes a back wall 44 having a plurality of fastener apertures 48 extending therethrough and at least one side, or sidewall, 50 extending therefrom. Panel box 16 further includes a plurality of knock outs 52 that are partially stamped through back wall 44 and sidewall 50. Each knock out 52 is a partially stamped opening that facilitates entry of a wire, cable and/or pipe (not shown) via a connector or fitting (not shown) once a portion of knockout 52 is fully removed. Fastener apertures 48 extend through back wall 44 and are configured to accept fasteners 34 to couple back wall 44 to a rear mounting surface (not shown). In the exemplary embodiment, fastener apertures 48 are similar to fastener apertures 32.

Each sidewall 50 extends outward from back wall 44 and has a front 54 and a rear 56. Sidewalls 50 extend from back wall 44 at rear 56 to facilitate positioning front 54 away from back wall 44 and define an open cavity 60 between back wall 44 and sides 50. Sides 50 include a flange 62 extending from front 54 inward toward open cavity 60. Flange 62 includes a plurality of fastener apertures 64 to facilitate coupling door panel 14 (shown in FIG. 1) to panel box 16.

Sidewalls 50 include at least one adjustment slot 66 longitudinally positioned between front 54 and rear 56. Each slot 66 has a front 68 and a rear 70 and is configured to slidably accept fastener 34 (shown in FIGS. 4, 5 and 6) to facilitate coupling panel box 16 to structure 11 (shown in FIGS. 4, 5, and 6). In the exemplary embodiment, panel box 16 includes a pair of adjustment slots 66 extending through sidewall 50. In other embodiments, any number of adjustment slots 66 can be used. In one embodiment, a cover (not shown) for slot 66 is partially stamped in side 50 for subsequent removal to expose slot 66.

Figure 3:
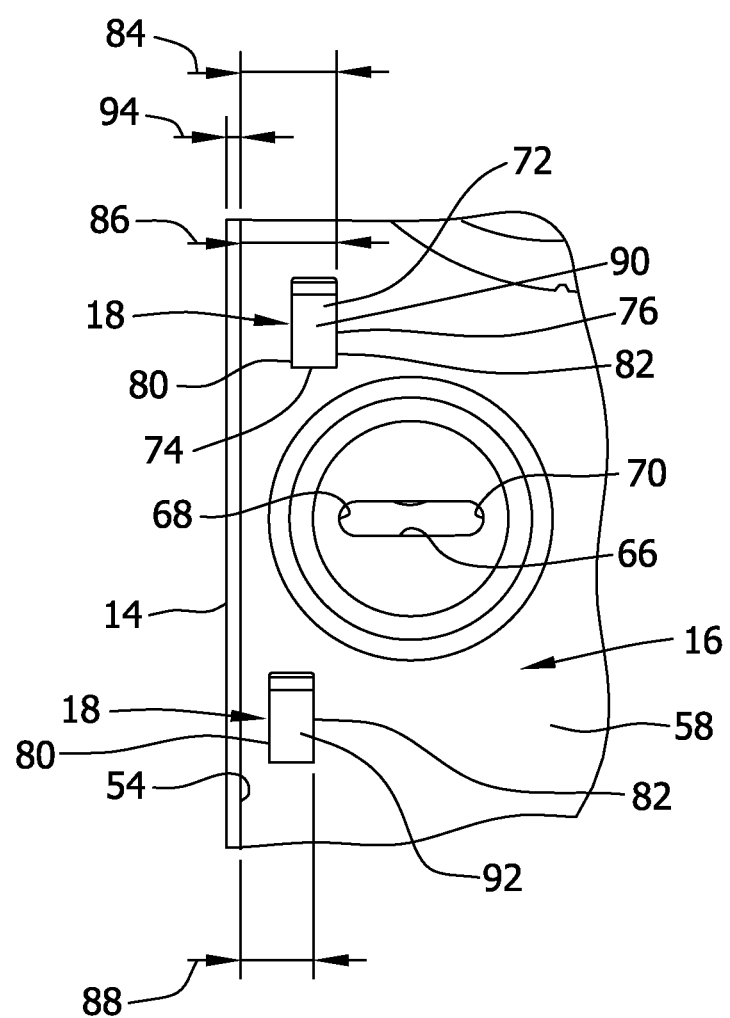
FIG. 3 illustrates a partial side view of the panel box shown in FIG. 2 and including a pair of positioning members.

FIG. 3 illustrates a partial side view of panel box 16 (shown in FIG. 2) including a pair of positioning members 18. Each positioning member 18 is removably coupled to panel box 16 to facilitate positioning on, and coupling panel box 16 to, first surface 12 (shown in FIGS. 1 and 4-7) as described herein. In one embodiment, positioning member 18 is coupled to, and forms part of, sidewall 50. In the exemplary embodiment, positioning member 18 is partially stamped into sidewall 50.

Each positioning member 18 includes a fixed end 72, a moveable end 74 and a body 76 connecting fixed end 72 and moveable end 74. Body 76 includes a front edge 80 and a rear edge 82. Fixed end 72 is coupled to side 50 and moveable end 74 is extendable from side 50. Moveable end 74 is configured to extend outward from sidewall 50 when acted upon by a force.

Positioning member 18 is located on side 50 at a pre-determined distance 84 as measured from rear edge 82 to front 54 of panel box 16. In one embodiment, pre-determined distance 84 is based on drywall thickness and is configured to accommodate for drywall thickness when panel box 16 is coupled to first surface 12. In the exemplary embodiment, side 50 includes multiple positioning members 18. At least one of positioning members 18 is located at first pre-determined distance 86 and at least one other positioning member 18 is located at second pre-determined distance 88. In other embodiments, positioning members 18 can be located at any number of pre-determined distances.

In one embodiment, positioning member 18 includes a first positioning member 90 and a second positioning member 92. First positioning member 90 is coupled to side 50 at a position above slot 66. Second positioning member 92 is coupled to side 50 at a position below slot 66. Further, first positioning member 90 is spaced at first pre-determined distance 86 as measured from rear edge 82 of first positioning member 90 to front 54. Second positioning member 92 is spaced at second pre-determined distance 88 as measured from rear edge 82 of second positioning member 92 to front 54. In one embodiment, first pre-determined distance 86 is different than second pre-determined distance 88. In the exemplary embodiment, first pre-determined distance 86 is greater than second pre-determined distance 88 to offset first positioning member 90 from second positioning member 92 within side 50.

First pre-determined distance 86 and second pre-determined distance 88 can represent industry standard distances for drywall thicknesses such as, but not limited to, standards of about ½ inch (about 12.7 mm) thickness and about ⅝ inch (about 15.9 mm) thickness. In the exemplary embodiment, first pre-determined distance 86 and second pre-determined distance 88 are configured to accommodate for drywall thickness when panel box 16 is coupled to structure 11.

In one embodiment, first pre-determined distance 86 and second pre-determined distance 88 each have a length range from about ⅛ inch (about 3.2 mm) to about 5 inches (about 127 mm). More specifically, first pre-determined distance 86 has a length range from about ¼ inch (about 6.4 mm) to about ¾ inches (about 19 mm). In the exemplary embodiment, first pre-determined distance 86 has a length of about ½ inch (about 12.7 mm) to accommodate a ½ inch drywall thickness. Alternatively, first pre-determined distance 86 includes a length such as a length for a ½ inch drywall thickness in addition to a width 94 of door panel 14. In an embodiment, second pre-determined distance 88 has a length range from about ⅛ inch to about ½ inch. Second pre-determined distanced 84 has a length of about ⅝ inch to accommodate for a ⅝ inch drywall thickness. Alternatively, second pre-determined distance 88 accommodates a ⅝ inch drywall thickness in addition to width 94 of door panel 14.

Figure 4:
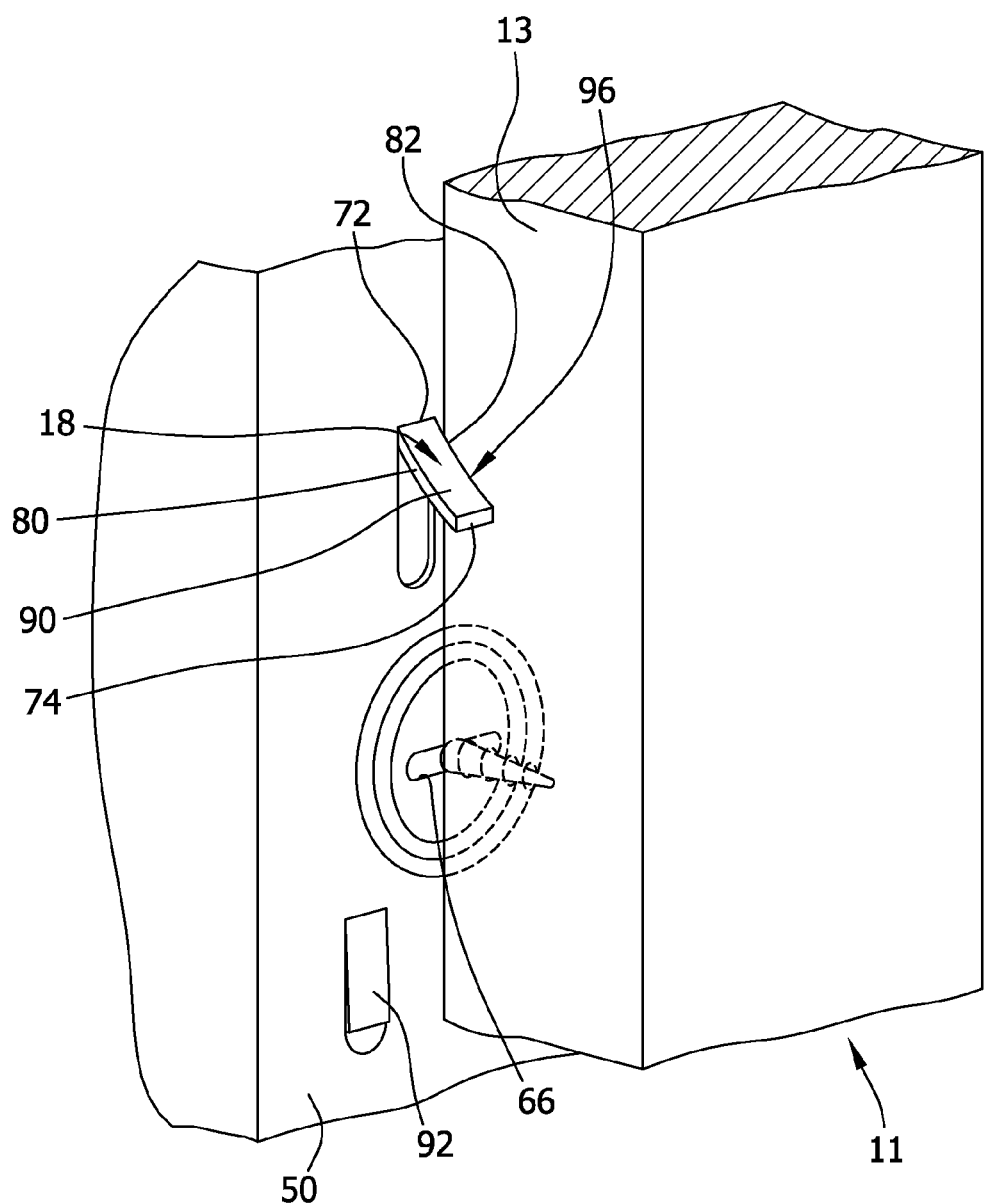
FIG. 4 illustrates one of the positioning members shown in FIG. 3 in an extended position and coupled to the structure.

FIG. 4 illustrates positioning member 18 shown in FIG. 3 in an extended position 96. Moveable end 74 is configured to rotate about 45° and contact second surface 13 during installation of panel box 16 to facilitate positioning panel box 16 with respect to second surface 13 as described herein. In one embodiment, moveable end 74 is configured to rotate between about 0° and 180° about fixed end 72. In the exemplary embodiment, moveable end 74 is configured to rotate between about 45° and 135° about fixed end 72.

Figure 7:
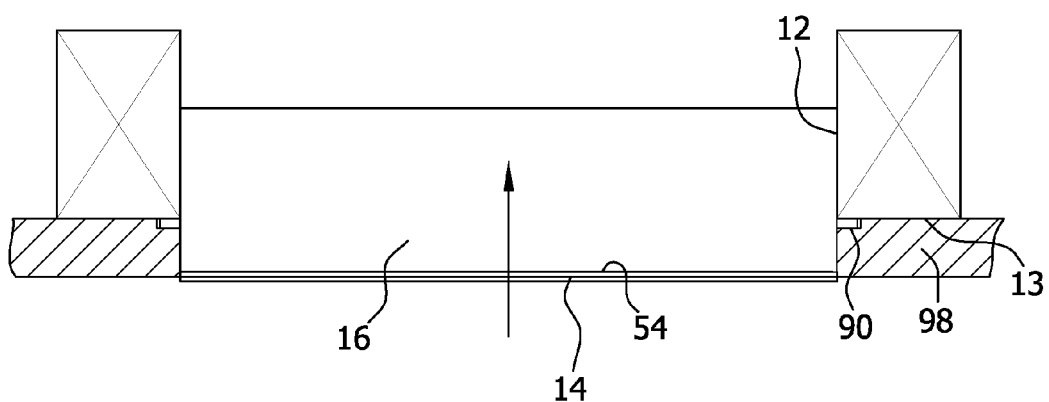
FIG. 7 is a plan view of the exemplary switchboard coupled to the structure shown in FIG. 4.

FIGS. 5 and 6 illustrate side views of switchboard 10 coupled to first surface 12 and FIG. 7 illustrates a plan view of switchboard 10 coupled to first surface 12. During an exemplary installation process for switchboard 10, the installer couples fastener 34, such as a screw, to first surface 12. The installer then proceeds to couple another fastener 34 to an opposing first surface 12. Fasteners 34 are coupled to respective first surfaces 12 wherein a portion of each fastener 34 extends outward from each first surface 12.

The installer determines the thickness for a drywall panel 98 to be installed. Upon determining the drywall thickness, the installer de-couples at least one positioning member 18 from side 50 according to the drywall thickness with a tool (not shown). In one embodiment, for a thick drywall width 100 (shown in FIG. 5) such as, but not limited to, a ⅝ inch thick drywall, the installer de-couples moveable end 74 of first positioning member 90 from side 50. In another embodiment, for a thin drywall width 102 (shown in FIG. 6) such as, but not limited to, a ½ inch thick drywall, the installer de-couples moveable end 74 of second positioning member 92 from side 50.

To de-couple moveable end 74 of either first positioning member 90 or second positioning member 92, the installer rotates the moveable end 74 under applied force about fixed end 72. The installer continues to rotate moveable end 74 to extended position 96. The installer rotates moveable end 74 by pushing and/or pulling moveable end 74 depending on the tool used by the installer. After moving moveable end 74 to extended position 96, the installer lifts panel box 16 and aligns slots 66 with installed fasteners 34 in first surface 12.

Slots 66 are moved around fasteners 34 to facilitate suspending panel box 16 on fasteners 34 between opposing first surfaces 12. Suspended panel box 16 is configured to slide forward and backwards along slots 66 and fasteners 34. To compensate for the drywall thickness, the installer slides panel box 16 backwards until extended respective positioning member 90, 92 contacts second surface 13. In one embodiment for a thick drywall width 100 (shown in FIG. 5), panel box 16 is moved along slot 66 until extended first positioning member 90 contacts second surface 13. In another embodiment, for a thin drywall width 102 (shown in FIG. 6), panel box 16 is moved along slot 66 until extended second positioning member 92 contacts second surface 13.

While the installer slides panel box 16 along slot 66, extended positioning member 18 is configured to stop panel box 16 at an appropriate depth by contacting first surface 13 to locate panel box 16 at pre-determined distance 84. The installer tightens fasteners 34 to couple panel box 16 to first surface 12. Front 54 and portions of side 50 extend beyond second surface 13 at pre-determined distance 84 to accommodate for drywall thickness of panel 98. As shown in FIG. 5, moveable end 74 of first positioning member 90 is configured to extend panel front 54 at first pre-determined distance 86 from second surface 13. As shown in FIG. 6, moveable end 74 of second positioning member 92 is configured to extend panel front 54 at second pre-determined distance 88 from second surface 13.

After panel box 16 is connected to first surfaces 12, installer inserts fasteners 34 into apertures 64 within flange 62. Door panel 14 is then coupled to flange 62 by inserting slotted apertures 32 around fasteners 34. Door panel 14 is configured to suspend from fasteners 34. The installer tightens fasteners 34 to couple door panel 14 to panel box 16. After door panel 14 is coupled to panel box 16, the installer pressurably removes selected removable panels 42 of recessed portion 40. Removable panels 42 provide access to electrical devices 20 such as switches, circuit breakers and instruments. Further, the installer hangs and couples drywall panel 98 around panel box 16 substantially flush with front 54 and/or door panel 14.

FIG. 8 is an exemplary flowchart 200 illustrating a method 210 of manufacturing a switchboard, for example switchboard 10 (shown in FIG. 1). Method 210 includes stamping 220 a panel box, for example panel box 16 (shown in FIG. 2). Stamping panel box includes forming 230 a wall and a sidewall, such as wall 44 and sidewall 58 (shown in FIG. 2).

Method 210 further includes partially stamping a positioning member, for example positioning member 12 (shown in FIG. 3) within side of panel box. In one embodiment, method includes partially stamping 240 a first positioning member, such as first positioning member 90 (shown in FIG. 3), within the sidewall of the panel box at a first predetermined distance from the front of the panel box. The method also includes partially stamping 250 a second positioning member such as second positioning member 92 (shown in FIG. 3), within the sidewall of the panel box at a second predetermined distance from the front of the panel box. In the exemplary embodiment, the method includes partially stamping 260 a fixed end and a moveable end into each of the first positioning member and the second positioning member. A slot can also be stamped within side of panel box. In one embodiment, partially stamping the positioning member includes stamping positioning members on opposite sides of slot.

Method 210 also includes pressurably forming 270 a recessed portion from a door panel, such as recessed portion 40 and door panel 14 (shown in FIG. 1). In one embodiment, the recessed portion is pressurably formed by a drawn stamping process that includes processes such as, but not limited to, a deep drawn process and a shallow drawn process. Method 210 includes forming a slotted, fastener aperture, for example aperture 32 (shown in FIG. 1) through door panel and coupling 280 the door panel to the panel box front, via a fastener inserted through fastener aperture, to facilitate forming switchboard.

The embodiments described herein provide a positioning member for a switchboard. The disclosed dimensions include all sub ranges therebetween. The dimensions facilitate locating, orientating and/or positioning switchboard with a surface. The positioning member can be used for new manufacture of switchboards or for retro-fit with existing switchboards. In one embodiment, the positioning member is configured to move from a flat position to an extended position. The positioning member is configured to move to the extended position to facilitate positioning switchboard along a structure surface to accommodate for a subsequent drywall thickness. The embodiments described herein also provide a formed recessed portion of a door panel. The recessed portion is configured to provide support and rigidity to the switchboard while reducing material waste in forming the door panel.

A technical effect of the switchboard described herein is that the positioning member is configured to move to an extended position to facilitate locating, positioning and/or orientating a panel box with a mounting surface. Another technical effect of the switchboard is a recessed portion of a door panel.

Exemplary embodiments of the positioning member, door panel and methods of locating the switchboard are described above in detail. The positioning member, door panel and methods are not limited to the specific embodiments described herein, but rather, components of the positioning member and/or the door panel and/or the switchboard and/or steps of the method may be utilized independently and separately from other components and/or steps described herein. For example, the positioning member, door panel and methods may also be used in combination with other electrical systems and methods, and are not limited to practice with only the switchboard as described herein. Rather, the exemplary embodiments can be implemented and utilized in connection with many other electrical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A switchboard for coupling with a structure surface, said switchboard comprising:
   a panel box comprising a wall and at least one sidewall extending from said wall, said at least one sidewall comprising:

a front;

a rear;

a first positioning member positioned at a first pre-determined distance from said front;

a second positioning member positioned at a second pre-determined distance from said front, said second pre-determined distance different than said first pre-determined distance, each of said first positioning member and second positioning member comprises a fixed end and a moveable end, each said moveable end configured to selectively contact the structure surface when said front of said panel box is coupled to the structure surface; and an adjustment slot positioned between said first positioning member and said rear and configured to slidably accept a fastener to selectively position said at least one sidewall with respect to the structure surface.

2. The switchboard of claim 1, further comprising a door panel coupled to said front, said door panel comprising a front face, a door panel wall and a recessed portion.

3. The switchboard of claim 2, wherein said door panel wall is configured to extend from said front face to said recessed portion.

4. The switchboard of claim 2, wherein said recessed portion is positioned offset from said front face.

5. The switchboard of claim 2, wherein said recessed portion comprises a plurality of partially stamped, removeable panels.

6. The switchboard of claim 1, wherein each said moveable end is configured to be moved to a position that is extended from said at least one sidewall.

7. The switchboard of claim 1, wherein said first positioning member is positioned on a first side of said adjustment slot and said second positioning member is positioned on a second side of said adjustment slot.

8. A switchboard for coupling with a structure surface, said switchboard comprising:

a panel box comprising:
  a front;
  a back wall; and
  at least one sidewall extending from said back wall and toward said front, said at least one sidewall comprising an adjustment slot configured to slidably accept a fastener;

a door panel coupled to said front;

a first positioning member positioned at a first pre-determined distance from said front and at a first side of said adjustment slot; and a second positioning member positioned at a second pre-determined distance from said front and at a second side of said adjustment slot, said second side is different than said first side, said second pre-determined distance is greater than said first pre-determined distance, each of said first positioning member and said second positioning member comprises a fixed end and a moveable end, wherein said adjustment slot is positioned at a third pre-determined distance from said front, said third pre-determined distance is greater than said second pre-determined distance, wherein said moveable end of said first positioning member is configured to selectively contact the structure surface when said front of said panel box is coupled to the structure surface at substantially said first pre-determined distance, and wherein said moveable end of said first positioning member is configured to selectively contact the structure surface when said front of said panel box is coupled to the structure surface at substantially said second pre-determined distance.

9. The switchboard of claim 8, wherein said door panel comprises a front face, a recessed portion, and a wall configured to extend from said front face to said recessed portion such that said recessed portion is positioned offset from said front face.

10. The switchboard of claim 8, wherein at least one of said first pre-determined distance and said second pre-determined distance includes a range from ⅛ inch to two inches.

11. A method of manufacturing a switchboard, said method comprising:

stamping a panel box to form a back wall and at least one sidewall extending to a front from the back wall;

stamping an adjustment slot within the at least one sidewall of the panel box, the adjustment slot configured to slidably accept a fastener;

partially stamping a first positioning member within the at least one sidewall of the panel box at a first pre-determined distance from the front and spaced from a first side of the adjustment slot, the first positioning member includes a first fixed end and a first moveable end;

partially stamping a second positioning member within the at least one sidewall of the panel box at a second pre-determined distance from the front and spaced from a second side of the adjustment slot, the second pre-determined distance is greater than the first pre-determined distance, the second side is different than the first side, the second positioning member includes a second fixed end and a second moveable end;

positioning the adjustment slot at a third pre-determined distance from the front, the third pre-determined distance is greater than the second pre-determined distance;

forming a recessed portion in a door panel; and coupling the door panel to the at least one sidewall of the panel box.

12. The method of claim 11, further comprising positioning the adjustment slot between the first positioning member and the second positioning member.

13. The method of claim 12, further comprising stamping an elongated, slotted fastener aperture through the door panel.

* * * * *